United States Patent
Nakagawa

(10) Patent No.: US 10,805,642 B2
(45) Date of Patent: Oct. 13, 2020

(54) IMAGE CODING APPARATUS, IMAGE CODING METHOD, IMAGE DECODING APPARATUS, IMAGE DECODING METHOD, AND IMAGE TRANSMISSION SYSTEM

(71) Applicant: Oki Electric Industry Co., Ltd., Tokyo (JP)

(72) Inventor: Satoshi Nakagawa, Tokyo (JP)

(73) Assignee: OKI ELECTRIC INDUSTRY CO., LTD., Tokyo (JP)

( * ) Notice: Subject to any disclaimer, the term of this patent is extended or adjusted under 35 U.S.C. 154(b) by 22 days.

(21) Appl. No.: 15/614,661

(22) Filed: Jun. 6, 2017

(65) Prior Publication Data

US 2018/0054632 A1  Feb. 22, 2018

(30) Foreign Application Priority Data

Aug. 19, 2016 (JP) .................................. 2016-161423

(51) Int. Cl.
| | |
|---|---|
| H04N 19/86 | (2014.01) |
| H04N 19/82 | (2014.01) |
| H04N 19/14 | (2014.01) |
| H04N 19/117 | (2014.01) |
| H04N 19/176 | (2014.01) |
| H04N 19/80 | (2014.01) |

(52) U.S. Cl.
CPC ........... *H04N 19/86* (2014.11); *H04N 19/117* (2014.11); *H04N 19/14* (2014.11); *H04N 19/176* (2014.11); *H04N 19/80* (2014.11); *H04N 19/82* (2014.11)

(58) Field of Classification Search
CPC ...... H04N 7/26; H04N 19/172; H04N 19/134; H04N 19/117; H04N 19/80; H04N 19/82; H04N 19/86; H04N 19/14; H04N 19/176
See application file for complete search history.

(56) References Cited

U.S. PATENT DOCUMENTS

| | | | | |
|---|---|---|---|---|
| 2009/0147854 | A1* | 6/2009 | Dane ...................... | H04N 5/145 375/240.16 |
| 2009/0257499 | A1* | 10/2009 | Karczewicz ........... | H04N 19/70 375/240.16 |

(Continued)

FOREIGN PATENT DOCUMENTS

| | | |
|---|---|---|
| JP | 2014030234 A | 2/2014 |
| WO | 2010143427 A1 | 12/2010 |

OTHER PUBLICATIONS

Narroschke et al. Joint Collaborative Team on Video Coding (JCT-VC) of ITU-T SG16 WP3 and ISO/IEC JTC1/SC29/WG11 7thMeeting: Geneva, CH, Nov. 21-30, 2011 CE12 Subtest 5: Deblocking filter using adaptive weighting factors.*

(Continued)

*Primary Examiner* — Frank F Huang
(74) *Attorney, Agent, or Firm* — Rabin & Berdo, P.C.

(57) ABSTRACT

To reduce picture quality deterioration and improve coding efficiency when image coding processing and image decoding processing involving deblocking filter processing are performed.

The present invention relates to an image transmission system including an image coding apparatus and an image decoding apparatus. The image coding apparatus of the present invention performs coding processing on a target picture in units of blocks and performs filter processing on a picture generated during coding processing by using a filter unit configured to perform filter processing using at least a deblocking filter. Further, the image decoding apparatus of the present invention decodes a target picture in units of blocks and performs filter processing on a picture generated during decoding processing by using a filter unit configured to perform filter processing using at least a deblocking filter. In addition, the deblocking filter determines a type of each block edge of the target picture, selects (Continued)

filter coefficients depending on the type of each block edge of the target picture from filter coefficient sets and applies the selected filter coefficients.

13 Claims, 7 Drawing Sheets

(56) References Cited

U.S. PATENT DOCUMENTS

2010/0111182 A1* 5/2010 Karczewicz ......... H04N 19/147
375/240.16

2013/0272425 A1* 10/2013 Van Der Auwera ........................
H04N 19/172
375/240.24

OTHER PUBLICATIONS

Norkin et al., "HEVC deblocking filtering and decisions," SPIE Applications of Digital Image Processing XXXV, vol. 8499,849912, pp. 1-8, Aug. 2012.*

Matthias Narroschke et al., "Deblocking filter using adaptive weighting factors", Joint Collaborative Team on Video Coding (JCT-VC), 6$^{th}$ Meeting: Torino, IT, Jul. 14-22, 2011.

Thomas Wiegand et al., "WD3: Working Draft 3 of High-Efficiency Video Coding", JCTVC-E, Mar. 30, 2011, JCTVC-E603, p. 119-126.

* cited by examiner

FIG. 7

| | | | | L | | | | |
|---|---|---|---|---|---|---|---|---|
| $p3_0$ | $p2_0$ | $p1_0$ | $p0_0$ | | $q0_0$ | $q1_0$ | $q2_0$ | $q3_0$ |
| $p3_1$ | $p2_1$ | $p1_1$ | $p0_1$ | | $q0_1$ | $q1_1$ | $q2_1$ | $q3_1$ |
| $p3_2$ | $p2_2$ | $p1_2$ | $p0_2$ | | $q0_2$ | $q1_2$ | $q2_2$ | $q3_2$ |
| $p3_3$ | $p2_3$ | $p1_3$ | $p0_3$ | | $q0_3$ | $q1_3$ | $q2_3$ | $q3_3$ |
| $p3_4$ | $p2_4$ | $p1_4$ | $p0_4$ | | $q0_4$ | $q1_4$ | $q2_4$ | $q3_4$ |
| $p3_5$ | $p2_5$ | $p1_5$ | $p0_5$ | | $q0_5$ | $q1_5$ | $q2_5$ | $q3_5$ |
| $p3_6$ | $p2_6$ | $p1_6$ | $p0_6$ | | $q0_6$ | $q1_6$ | $q2_6$ | $q3_6$ |
| $p3_7$ | $p2_7$ | $p1_7$ | $p0_7$ | | $q0_7$ | $q1_7$ | $q2_7$ | $q3_7$ |

IMAGE CODING APPARATUS, IMAGE CODING METHOD, IMAGE DECODING APPARATUS, IMAGE DECODING METHOD, AND IMAGE TRANSMISSION SYSTEM

CROSS REFERENCE TO RELATED APPLICATION(S)

This application is based upon and claims benefit of priority from Japanese Patent Application No. 2016-161423, filed on Aug. 19, 2016, the entire contents of which are incorporated herein by reference.

BACKGROUND

The present invention relates to an image coding apparatus, an image coding method, an image decoding apparatus, an image decoding method, and an image transmission system and is applicable to a system that performs compression coding on image information and transmits the coded image information as stream data.

Compressive coding processing of image information according to an image coding method such as H. 264/MPEG-4 AVC (hereinafter simply referred to as "AVC") and H. 265/MPEG-H HEVC (hereinafter simply referred to as "HEVC") involves quantizing a transform coefficient obtained by performing space transformation such as a discrete cosine transform (hereinafter simply referred to as a "DCT") and a discrete sine transform (hereinafter simply referred to as "DST") on a predictive residual signal corresponding to a difference between a predictive picture on which intra-prediction or inter-prediction such as motion compensation prediction has been performed and an input target picture and entropy-coding the quantized transform coefficient, for each of processing units (e.g., rectangular blocks) obtained by dividing the input target picture, thereby realizing highly efficient image compression.

FIG. 5 is a block diagram illustrating a configuration of a conventional image coding apparatus 300.

FIG. 5 is a block diagram illustrating an example of the configuration of the image coding apparatus 300 using HEVC.

In the image coding apparatus 300 illustrated in FIG. 5, a predictive picture is generated by an inter-prediction unit 310 that performs inter-prediction (inter-picture prediction) involving motion compensation or by an intra-prediction unit 311 that performs intra-prediction (intra-screen prediction) from coded samples and the like in a screen for each processing unit region such as a coding unit on the basis of an input image (input coding target pictures). In the image coding apparatus 300, a difference processing unit 301 outputs a difference (hereinafter simply referred to as a "predictive residual signal") between the predictive picture and the input image. In the image coding apparatus 300, a transformation unit 302 transforms the predictive residual signal into coefficients (hereinafter simply referred to as "transform coefficients") of a space transform domain of a discrete cosine transform (DCT) or a discrete sine transform (DST). In the image coding apparatus 300, a quantization unit 303 quantizes the obtained transform coefficients. In the image coding apparatus 300, an entropy coding unit 304 performs entropy coding process (e.g., coding process such as variable length coding and arithmetic coding) on the quantized transform coefficients and outputs a bit stream of coded data (hereinafter simply referred to as a "coded stream"). Further, prediction mode information, motion vector information and the like are multiplexed with the coded stream generated by the entropy coding unit 304.

In addition, in the image coding apparatus 300, the quantized transform coefficients are subjected to inverse quantization processing (reverse of the process of the quantization unit 303) by an inverse quantization unit 305 and are subjected to inverse transformation (reverse of the transform process of the transformation unit 302) by an inverse transformation unit 306. In the image coding apparatus 300, an adding unit 307 adds the predictive residual signal reconstructed by inverse transformation to the predictive picture to generate a picture (hereinafter simply referred to as a "reconstructed picture"). In the image coding apparatus 300, an in-loop filter unit 308 performs a process of mitigating block distortion and the like (a process of a deblocking filter and the like) on the reconstructed picture and outputs the processed reconstructed picture as a reference picture for motion compensation of inter-prediction at a time of coding a subsequent picture. In addition, in the image coding apparatus 300, the reference picture is stored in a reference picture buffer 309.

FIG. 6 is a block diagram illustrating a configuration of a conventional image decoding apparatus 400.

The conventional image decoding apparatus 400 illustrated in FIG. 6 performs processing of decoding data of a coded stream generated by the image coding apparatus 300.

When the coded stream is input to the image decoding apparatus 400, an entropy decoding unit 404 decodes the data of the coded stream to obtain decoded data such as quantized transform coefficients. Subsequently, in the image decoding apparatus 400, an inverse quantization unit 405 performs an inverse quantization process (reverse of the process of the quantization unit 303 of the image coding apparatus 300) on the quantized transform coefficients and an inverse transformation unit 406 performs an inverse transformation process (reverse of the transformation process of the transformation unit 302) on the quantized transform coefficients to restore the predictive residual signal. Further, in the image decoding apparatus 400, prediction mode information, motion vector information and the like are obtained from the decoded data. Subsequently, in the image decoding apparatus 400, a predictive picture generated by an intra-prediction unit 411 or a predictive picture generated by an inter-prediction unit 410 (any predictive picture selected by a switching unit 412) is supplied to an adding unit 407. In the image decoding apparatus 400, the adding unit 407 adds the predictive picture to the restored predictive residual signal to generate the same reconstructed picture as that of the image coding apparatus 300. In the image decoding apparatus 400, an in-loop filter unit 408 performs processing such as deblocking filter processing to output the processed picture as a decoded picture and the decoded picture is stored in a reference picture buffer 409 as a reference picture for subsequent inter prediction.

As described above, a picture is processed for each block of a processing unit in coding technologies such as AVC and HEVC, and thus picture quality deterioration having discontinuity at a block boundary which is called block distortion easily occurs. However, the picture quality deterioration is alleviated by deblocking filters (an in-loop filter unit 408 and an in-loop filter unit 308) in the conventional image coding apparatus 300 and the image decoding apparatus 400, as described above.

FIG. 7 is an explanatory diagram illustrating surroundings of a block boundary (neighboring samples of the block boundary) that is a processing target of deblocking filter processing in the coding technologies such as HEVC.

In FIG. 7, L is a line (a boundary line) indicating a block boundary (also referred to hereinafter as a "block edge"). As illustrated in FIG. 7, three types of filters including a luma strong filter, a luma weak filter and a chroma filter, are used depending on block strength decided in accordance with a block boundary type (intra block boundary, motion compensation block boundary or transform block boundary), neighboring sample values and the like in HEVC. For example, a conventional luma strong filter performs filter processing represented by the following expressions (1-1) to (1-6). In the following expressions (1-1) to (1-6), sample values $p_i'$ and $q_i'$ after luma strong filter processing are obtained from sample values $p_i$ and $q_i$ of a reconstructed picture. The following expressions (1-1) to (1-3) show an example of obtaining $p_0'$, $p_1'$ and $p_2'$ after luma strong filter processing from $p_0$, $p_1$, $p_2$, $p_3$ and the like which are sample values of the reconstructed picture. In addition, the following expressions (1-4) to (1-6) show an example of obtaining $q_0'$, $q_1'$ and $q_2'$ after luma strong filter processing from $q_0$, $q_1$, $q_2$, $q_3$ and the like which are sample values of the reconstructed picture. Meanwhile, "Clip3(a,b,x)" in the following expressions (1-1) to (1-6) is a function of clipping "x" in a range of a to b.

$$p_0'=\text{Clip3}(p_0-2*t_c,p_0+2*t_c,(p_2+2*p_1+2*p_0+2*q_0+q_1+4)>>3) \quad (1\text{-}1)$$

$$p_1'=\text{Clip3}(p_1-2*t_c,p_1+2*t_c,(p_2+p_1+p_0+q_0+2)>>2) \quad (1\text{-}2)$$

$$p_2'=\text{Clip3}(p_2-2*t_c,p_2+2*t_c,(2*p_3+3*p_2+p_1+p_0+q_0+4)>>3) \quad (1\text{-}3)$$

$$q_0'=\text{Clip3}(q_0-2*t_c,q_0+2*t_c,(p_1+2*p_0+2*q_0+2*q_1+q_2+4)>>3) \quad (1\text{-}4)$$

$$q_1'=\text{Clip3}(q_1-2*t_c,q_1+2*t_c,(p_0+q_0+q_1+q_2+2)>>2) \quad (1\text{-}5)$$

$$q_2'=\text{Clip3}(q_2-2*t_c,q_2+2*t_c,(p_0+q_0+q_1+3*q_2+2*q_3+4)>>3) \quad (1\text{-}6)$$

As described above, a fixed filter coefficient is used for each filter type in a conventional image coding technology such as HEVC, and sometimes filter processing that is not necessarily suitable for a target picture is performed.

As a technology for performing conventional deblocking filter processing more adaptively, there is a technology disclosed in Matthias Narroschke and Ann-Kathrin Seifert, "Deblocking filter using adaptive weighting factors (Document: JCTVC-F405)," Joint Collaborative Team on Video Coding (JCT-VC) of ITU-T SG16 WP3 and ISO/IEC JTC1/SC29/WG11 6th Meeting: Torino, July, 2011, [searched on 20 Jul. 2016], INTERNET <URL: http://phenix.it-sudparis.eu/jct/doc_end_user/documents/6_Torino/wg11/JCTVC-F405-v2.zip> (Non-Patent Literature 1). This technology proposes a method of performing filter processing by varying sample values using $\alpha\Delta$, which is obtained by multiplying a variation $\Delta$ of sample values according to conventional filter processing by a weight $\alpha$, and achieving adaptability by permitting the weight $\alpha$ to be designated.

SUMMARY

As described above, deblocking filter processing according to the conventional image coding technology uses a fixed filter coefficient and thus sometimes filter processing that is not necessarily suitable for a target picture is performed. Furthermore, there is a problem that a sufficiently suitable filter depending on properties of a target picture is not adapted even using the method of multiplying a variation by a weight as described in Non-Patent Literature 1.

To solve such a problem, there is a need for an image coding apparatus, an image coding method, an image decoding apparatus, an image decoding method and an image transmission system which are capable of reducing picture quality deterioration and improving coding efficiency when an image coding process and an image decoding process involving deblocking filter processing are performed.

According to a first embodiment of the present invention, there is provided an image coding apparatus that codes pictures constituting an image, (1) the image coding apparatus including a coding processing unit configured to perform coding processing on a target picture of coding in units of blocks and output coded data, the coding processing unit performing filter processing on a picture generated during coding processing by using a filter unit configured to perform filter processing using at least a deblocking filter. (2) The deblocking filter includes (2-1) a filter coefficient set storage unit configured to store a filter coefficient set composed of a plurality of filter coefficients, (2-2) an edge type determination unit configured to determine a type of a block edge, for each block edge of the target picture, (2-3) a filter coefficient selection unit configured to select filter coefficients to be applied from the filter coefficient set stored in the filter coefficient set storage unit depending on the type determined by the edge type determination unit, for each block edge of the target picture, and (2-4) a filter processing unit configured to perform filter processing on neighboring samples of the block edge by using the filter coefficients selected by the filter coefficient selection unit, for each block edge of the target picture.

According to a second embodiment of the present invention, there is provided an image decoding apparatus that decodes coded data in which respective pictures constituting an image have been coded, (1) the image decoding apparatus including a decoding processing unit configured to decode a target picture of decoding from coded data in units of blocks, the decoding processing unit performing filter processing on a picture generated during decoding processing by using a filter unit configured to perform filter processing using at least a deblocking filter. (2) The deblocking filter includes (2-1) a filter coefficient set storage unit configured to store a filter coefficient set composed of a plurality of filter coefficients, (2-2) an edge type determination unit configured to determine a type of a block edge, for each block edge of the target picture, (2-3) a filter coefficient selection unit configured to select filter coefficients to be applied from the filter coefficient set stored in the filter coefficient set storage unit depending on the type determined by the edge type determination unit, for each block edge of the target picture, and (2-4) a filter processing unit configured to perform filter processing on neighboring samples of the block edge by using the filter coefficients selected by the filter coefficient selection unit, for each block edge of the target picture.

According to a third embodiment of the present invention, there is provided an image coding program causing a computer installed in an image coding apparatus that codes pictures constituting an image, to function as (1) a coding processing unit configured to perform coding processing on a target picture of coding in units of blocks and output coded data, the coding processing unit performing filter processing on a picture generated during coding processing by using a filter unit configured to perform filter processing using at least a deblocking filter. (2) The deblocking filter includes (2-1) a filter coefficient set storage unit configured to store a filter coefficient set composed of a plurality of filter coefficients, (2-2) an edge type determination unit configured to determine a type of a block edge, for each block edge of the target picture, (2-3) a filter coefficient selection unit configured to select filter coefficients to be applied from the filter coefficient set stored in the filter coefficient set storage unit depending on the type determined by the edge type determination unit, for each block edge of the target picture, and (2-4) a filter processing unit configured to perform filter processing on neighboring samples of the block edge by using the filter coefficients selected by the filter coefficient selection unit, for each block edge of the target picture.

According to a fourth embodiment of the present invention, there is provided an image decoding program causing a computer installed in an image decoding apparatus that decodes coded data in which respective pictures constituting an image have been coded, to function as (1) a decoding processing unit configured to decode a target picture of decoding from coded data in units of blocks, the decoding processing unit performing filter processing on a picture generated during decoding processing by using a filter unit configured to perform filter processing using at least a deblocking filter. (2) The deblocking filter includes (2-1) a filter coefficient set storage unit configured to store a filter coefficient set composed of a plurality of filter coefficients, (2-2) an edge type determination unit configured to determine a type of a block edge, for each block edge of the target picture, (2-3) a filter coefficient selection unit configured to select filter coefficients to be applied from the filter coefficient set stored in the filter coefficient set storage unit depending on the type determined by the edge type determination unit, for each block edge of the target picture, and (2-4) a filter processing unit configured to perform filter processing on neighboring samples of the block edge by using the filter coefficients selected by the filter coefficient selection unit, for each block edge of the target picture.

According to a fifth embodiment of the present invention, there is provided an image coding method that is performed by an image coding apparatus configured to code respective pictures constituting an image. (1) The image coding apparatus includes a coding processing unit. (2) The coding processing unit performs coding processing on a target picture of coding in units of blocks and outputs coded data, the coding processing unit performing filter processing on a picture generated during coding processing using a filter unit configured to perform filter processing using at least a deblocking filter. (3) The deblocking filter includes a filter coefficient set storage unit, an edge type determination unit, a filter coefficient selection unit, and a filter processing unit. (4) The filter coefficient set storage unit stores a filter coefficient set composed of a plurality of filter coefficients. (5) The edge type determination unit determines a type of a block edge, for each block edge of the target picture. (6) The filter coefficient selection unit selects a filter coefficient set to be applied depending on the type determined by the edge type determination unit, for each block edge of the target picture. (7) The filter processing unit performs filter processing on neighboring samples of the block edge by using the filter coefficients selected by the filter coefficient selection unit, for each block edge of the target picture.

According to a sixth embodiment of the present invention, there is provided an image decoding method that is performed by an image decoding apparatus configured to decode coded data in which respective pictures constituting an image have been coded. (1) The image decoding apparatus includes a decoding processing unit. (2) The decoding processing unit decodes a target picture of decoding from coded data in units of blocks, the decoding processing unit performing filter processing on a picture generated during decoding processing by using a filter unit configured to perform filter processing using at least a deblocking filter. (3) The deblocking filter includes a filter coefficient set storage unit, an edge type determination unit, a filter coefficient selection unit, and a filter processing unit. (4) The filter coefficient set storage unit stores a filter coefficient set composed of a plurality of filter coefficients. (5) The edge type determination unit determines a type of a block edge, for each block edge of the target picture. (6) The filter coefficient selection unit selects a filter to be applied depending on the type determined by the edge type determination unit, for each block edge of the target picture. (7) The filter processing unit performs filter processing on neighboring samples of the block edge by using the filter coefficients selected by the filter coefficient selection unit, for each block edge of the target picture.

According to a seventh embodiment of the present invention, there is provided an image transmission system including: an image coding apparatus configured to code respective pictures constituting an image; and an image decoding apparatus configured to decode coded data coded by the image coding apparatus. The image coding apparatus according to the first embodiment of the present invention is applied as the image coding apparatus, and the image decoding apparatus includes a decoding processing unit configured to decode decoding target picture of decoding from coded data in units of blocks and perform filter processing on a picture generated during decoding processing by using a filter unit configured to perform filter processing using at least a deblocking filter, the deblocking filter includes: a filter coefficient set storage unit configured to store a filter coefficient set composed of a plurality of filter coefficients; an edge type determination unit configured to determine a type of a block edge, for each block edge of the target picture; a filter coefficient selection unit configured to select filter coefficients to be applied from the filter coefficient set stored in the filter coefficient set storage unit depending on the type determined by the edge type determination unit, for each block edge of the target picture; and a filter processing unit that performs filter processing on neighboring samples of the block edge by using the filter coefficients selected by the filter coefficient selection unit, for each block edge of the target picture.

According to the embodiment of the present invention, it is possible to reduce picture quality deterioration and improve coding efficiency when an image coding process and an image decoding process involving deblocking filter processing are performed.

BRIEF DESCRIPTION OF THE DRAWINGS

FIG. 7 is an explanatory diagram illustrating an example of a block boundary (block edge) of a picture processed in an image coding apparatus and an image decoding apparatus.

DETAILED DESCRIPTION OF THE EMBODIMENT(S)

(A) Primary Embodiment

Figure 1:
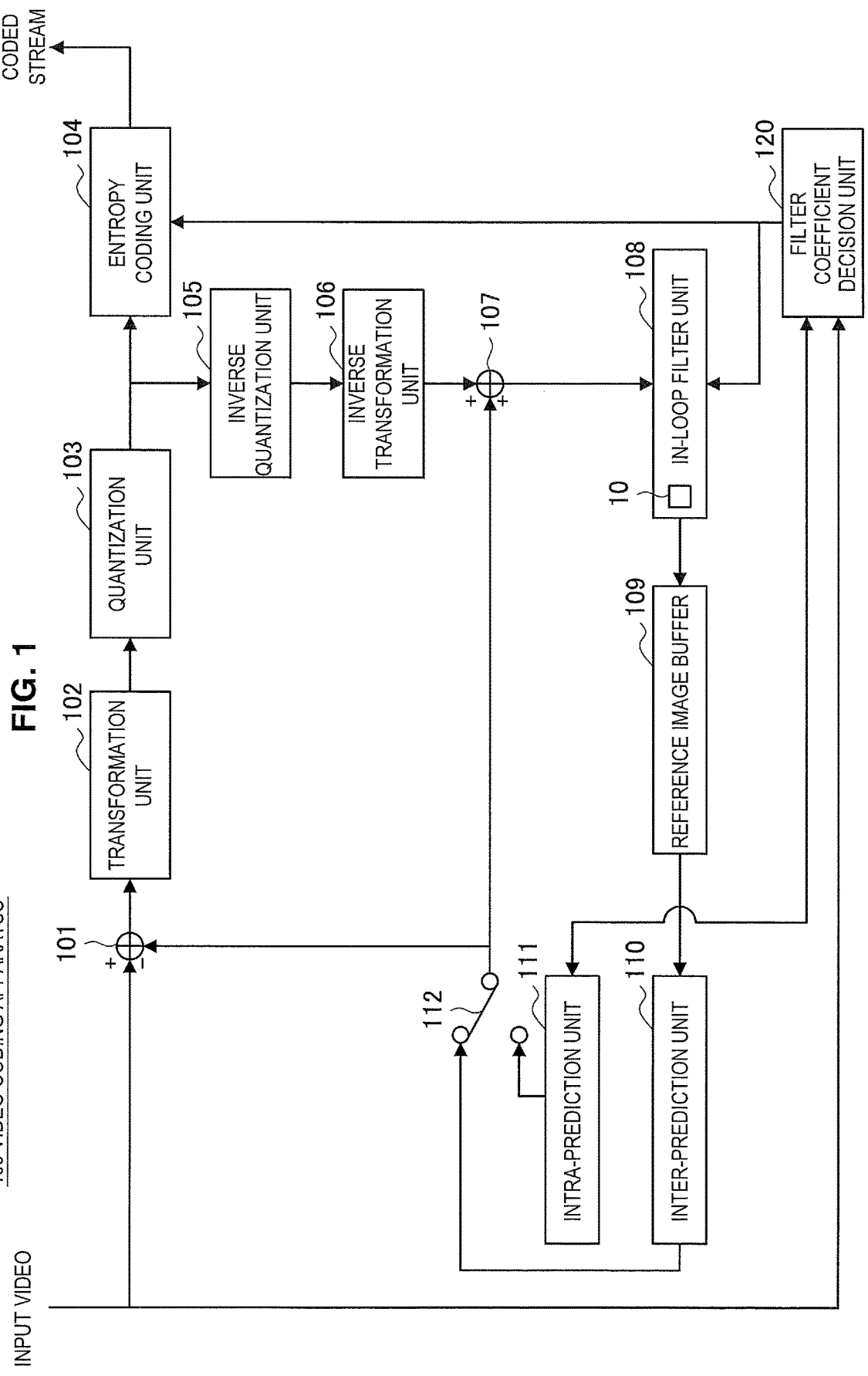
FIG. 1 is a block diagram illustrating a functional configuration of an image coding apparatus according to an embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A-1) Configuration of Embodiment

Figure 4:
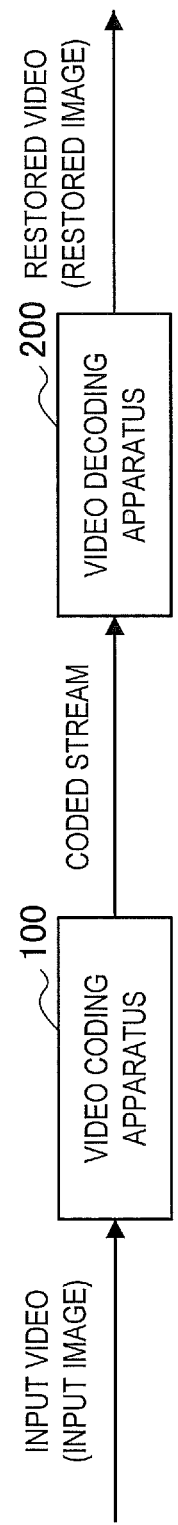
FIG. 4 is a block diagram illustrating the overall configuration of an image transmission system according to an embodiment.
Figure 5:
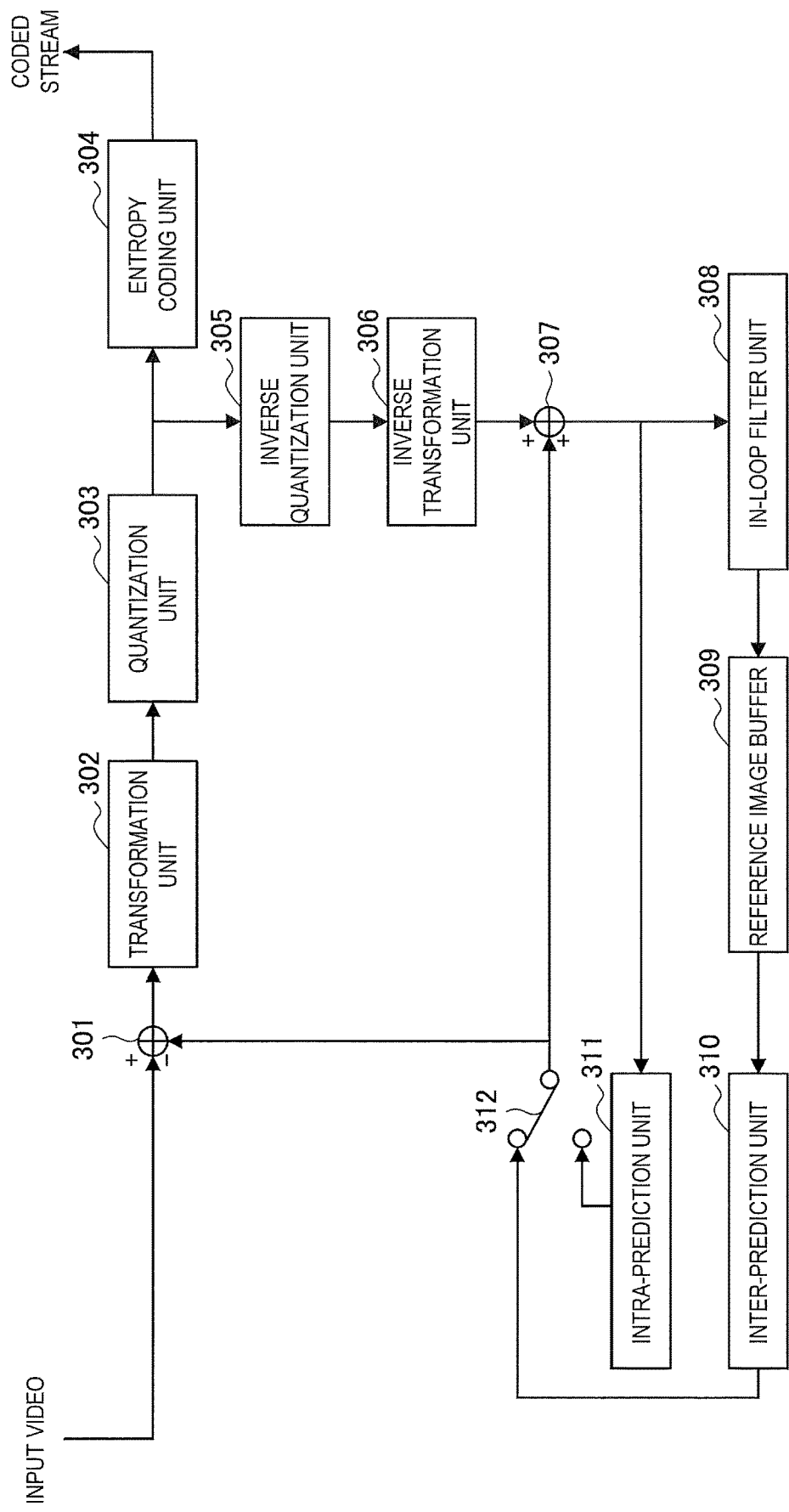
FIG. 5 is a block diagram illustrating a functional configuration of a conventional image coding apparatus.
Figure 6:
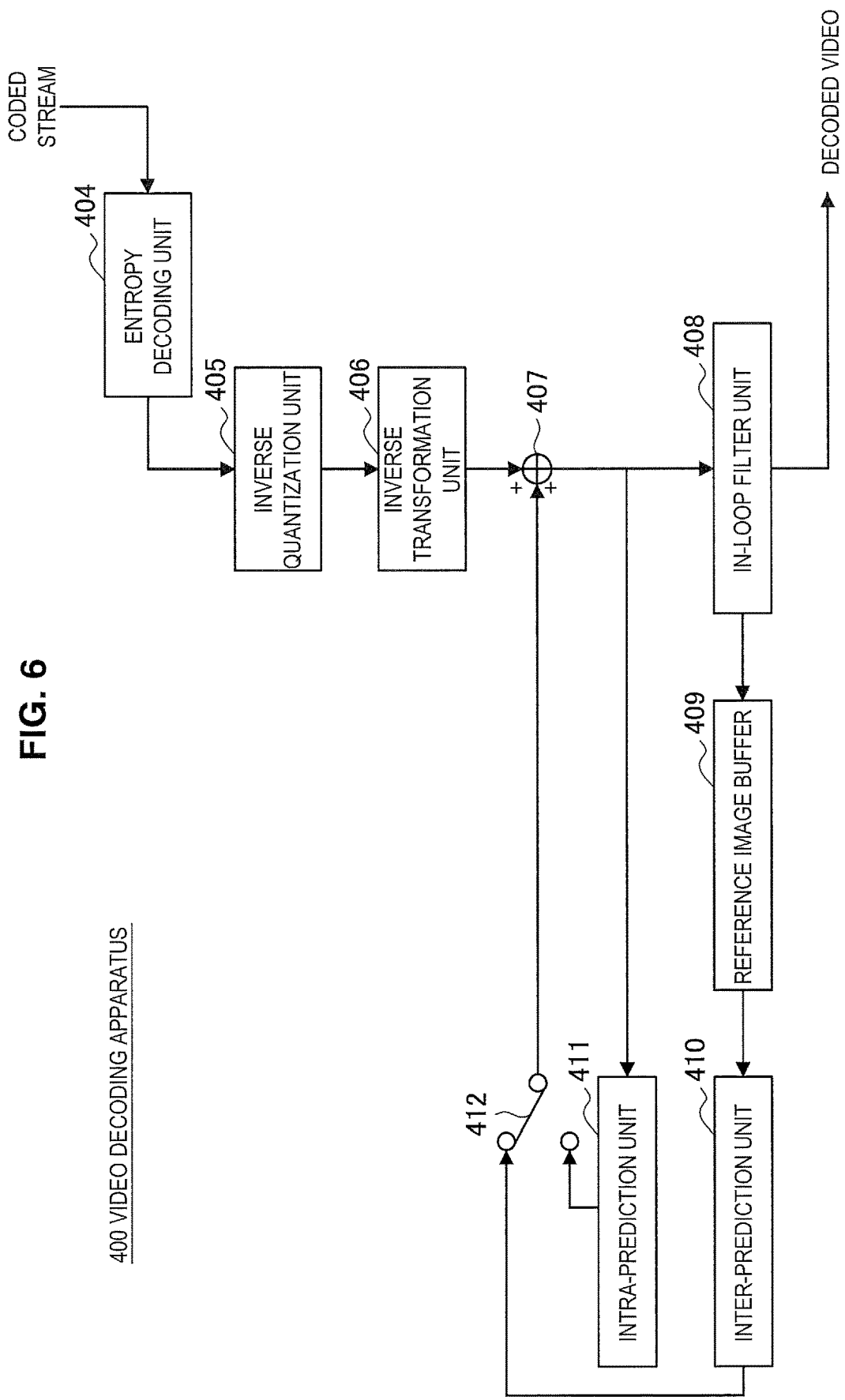
FIG. 6 is a block diagram illustrating a functional configuration of a conventional image decoding apparatus.

FIG. 4 is a block diagram illustrating the overall configuration of an image transmission system 1 of the present embodiment.

The image transmission system 1 illustrated in FIG. 4 includes an image coding apparatus 100 that codes coding target pictures (input pictures) constituting a coding target image (input image) and outputs coded streams, and an image decoding apparatus 200 that decodes the coded streams to obtain decoded pictures constituting a decoded image. A connection configuration between the image coding apparatus 100 and the image decoding apparatus 200 is not limited and, for example, transmission may be performed through communication via a network, and data may be supplied offline (e.g., supplied through a data recording medium such as a DVD or an HDD).

The image coding apparatus 100 performs coding processing on an input coding target picture for each region (referred to hereinafter as a "processing unit region) of a predetermined unit (e.g., a block having a predetermined size) such as a coding unit.

Next, an internal configuration of the image coding apparatus 100 will be described using FIG. 1.

As illustrated in FIG. 1, the image coding apparatus 100 includes a difference processing unit 101, a transformation unit 102, a quantization unit 103, an entropy coding unit 104, an inverse quantization unit 105, an inverse transformation unit 106, an adding unit 107, an in-loop filter unit 108, a reference picture buffer 109, an inter-prediction unit 110, an intra-prediction unit 111 and a switching unit 112.

For example, the image coding apparatus 100 may be configured by installing a program (including an image coding program according to an embodiment) in a computer. A functional configuration of the image coding apparatus 100 in the case can also be illustrated using FIG. 1.

The inter-prediction unit 110 generates and outputs a predictive picture based on inter-prediction (inter-picture prediction processing) involving motion compensation with reference to pictures stored in the reference picture buffer 109 for processing unit regions.

The intra-prediction unit 111 outputs a predictive picture based on prediction (intra-prediction processing) from intra-picture coded reconstructed samples and the like for the processing unit regions.

The switching unit 112 switches predictive picture prediction methods (any of inter-prediction and intra-prediction) depending on a prediction mode.

The difference processing unit 101 obtains a predictive residual signal corresponding to a difference between an input picture and a predictive picture.

The transformation unit 102 performs transformation processing on the predictive residual signal in accordance with a discrete cosine transform (DCT) or a discrete sine transform (DST).

The quantization unit 103 quantizes the predictive residual signal transformed by the transformation unit 102.

The entropy coding unit 104 multiplexes quantized transform coefficients and other additional information (e.g., prediction mode information, motion vector information and the like), perform entropy-coding on them, and outputs coded streams as a result of the coding process.

The inverse quantization unit 105 performs inverse quantization processing (reverse of the process of the quantization unit 103) on the quantized transform coefficients.

The inverse transformation unit 106 performs inverse transformation (reverse of the transformation process of the transformation unit 102) on the transform coefficients that has been inversely quantized by the inverse quantization unit 105, to restore the predictive residual signal.

The adding unit 107 adds the predictive picture to the restored predictive residual signal to obtain a reconstructed picture.

The in-loop filter unit 108 performs one or multiple filter processes on the reconstructed picture obtained by the adding unit 107 and outputs a decoded picture subjected to the filter process. The in-loop filter unit 108 performs at least a filter process using a deblocking filter 10 which will be described below. Further, a filter such as a sample adaptive offset used in HEVC may be added to the in-loop filter unit 108 in addition to the deblocking filter 10.

A filter coefficient decision unit 120 selects and decides a filter coefficient group (referred to hereinafter as a "filter coefficient set") used for deblocking processing of the in-loop filter unit 108. A detailed configuration of the filter coefficient decision unit 120 will be described below. The filter coefficient set is composed of a plurality of filter coefficients.

Further, information on the filter coefficient set (the filter coefficient set used for deblocking filter processing) decided by the filter coefficient decision unit 120 of the image coding apparatus 100 is also provided to the entropy coding unit 104. Then, the entropy coding unit 104 multiplexes the information on the filter coefficient set decided by the filter coefficient decision unit 120 with the coded streams as additional information of coding information and outputs the multiplexed coded streams.

The reference picture buffer 109 stores the decoded picture filtered by the in-loop filter unit 108 as a reference picture for motion compensation of inter-prediction.

As described above, in the image coding apparatus 100, the filter coefficient set used in deblocking filter processing of the in-loop filter unit 108 is decided by the filter coefficient decision unit 120. In addition, the information on the filter coefficient set decided by the filter coefficient decision unit 120 is coded and multiplexed with the coded streams by the entropy coding unit 104 and output therefrom.

Figure 2:
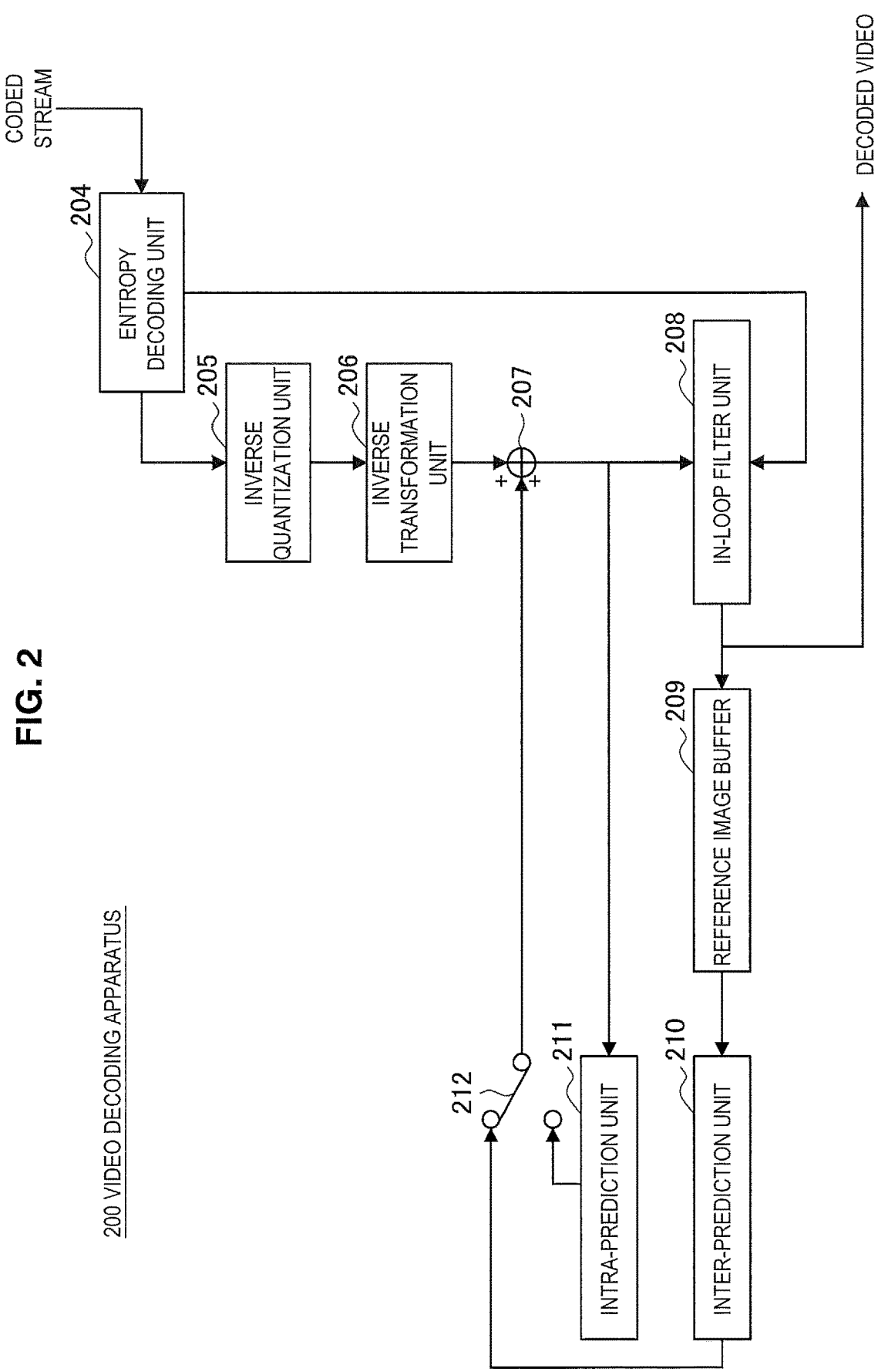
FIG. 2 is a block diagram illustrating a functional configuration of an image decoding apparatus according to an embodiment.

Next, the internal configuration of the image decoding apparatus 200 will be described using FIG. 2

The image decoding apparatus 200 includes an entropy decoding unit 204, an inverse quantization unit 205, an inverse transformation unit 206, an adding unit 207, an in-loop filter unit 208, a reference picture buffer 209, an inter-prediction unit 210, an intra-prediction unit 211 and a switching unit 212.

For example, the image decoding apparatus 200 may be configured by installing a program (including an image decoding program according to an embodiment) in a computer. A functional configuration of the image decoding apparatus 200 in this case can also be illustrated using FIG. 2 in the case.

The entropy decoding unit 204 performs entropy-decoding on input coded streams to acquire decoded data. The decoded data includes quantized transform coefficients (data obtained by transforming a predictive residual signal through DCT or the like and quantizing the transformed predictive residual signal). Further, the coded streams include other additional information as described above. It is assumed that the additional information includes prediction mode information, motion vector information, a filter coefficient set used for deblocking filter processing (a filter coefficient set decided by the filter coefficient decision unit 120 of the image coding apparatus 100) and the like.

The inverse quantization unit 205 performs an inverse quantization (reverse of the process of the quantization unit 103 of the image coding apparatus 100) on the transform coefficients decoded by the entropy decoding unit 204 (quantized transform coefficients).

The inverse transformation unit 206 performs inverse transformation process (reverse of the transformation process of the transformation unit 102 of the image coding apparatus 100) on the transform coefficients that have been inversely quantized by the inverse quantization unit 205 to obtain a restored predictive residual signal.

The inter-prediction unit 210 performs inter-prediction processing by performing motion compensation prediction to obtain a predictive picture on the basis of reference pictures stored in the reference picture buffer 209.

The intra-prediction unit 211 performs intra-prediction processing based on intra-picture reconstructed samples or the like to obtain a predictive picture.

The switching unit 212 switches the predictive pictures depending on the prediction mode information decoded from the coded streams by the entropy decoding unit 204 and provides a switched predictive picture to the adding unit 207.

The adding unit 207 adds the predictive picture (predictive picture supplied from the inter-prediction unit 210 or the intra-prediction unit 211) to the predictive residual signal obtained by the inverse transformation unit 206 to generate a reconstructed picture (decoded picture before filter processing).

The in-loop filter unit 208 performs one or multiple filter processes on the reconstructed picture (decoded picture before filter processes) output from the adding unit 207 to obtain a decoded picture subjected to the filter process. In the image decoding apparatus 200, the decoded picture obtained by the in-loop filter unit 208 is output as a decoding process result (final decoded picture). The in-loop filter unit 208 performs at least a filter process using a deblocking filter 20 which will be described below. The deblocking filter 20 performs deblocking filter process using the filter coefficient set obtained through decoding of the entropy decoding unit 204. In addition, the in-loop filter unit 208 may add processing using a filter such as a sample adaptive offset used in HEVC in addition to the deblocking filter 20, in a way similar to the image coding apparatus 100.

The reference picture buffer 209 stores the decoded picture output from the in-loop filter unit 208 as a reference picture for the following inter-prediction processing (inter-prediction processing by the inter-prediction unit 210).

Next, the internal configuration of the deblocking filter 10 constituting the image coding apparatus 100 (the in-loop filter unit 108) and the internal configuration of the deblocking filter 20 constituting the image decoding apparatus 200 (the in-loop filter unit 208) will be described using FIG. 3.

Figure 3:
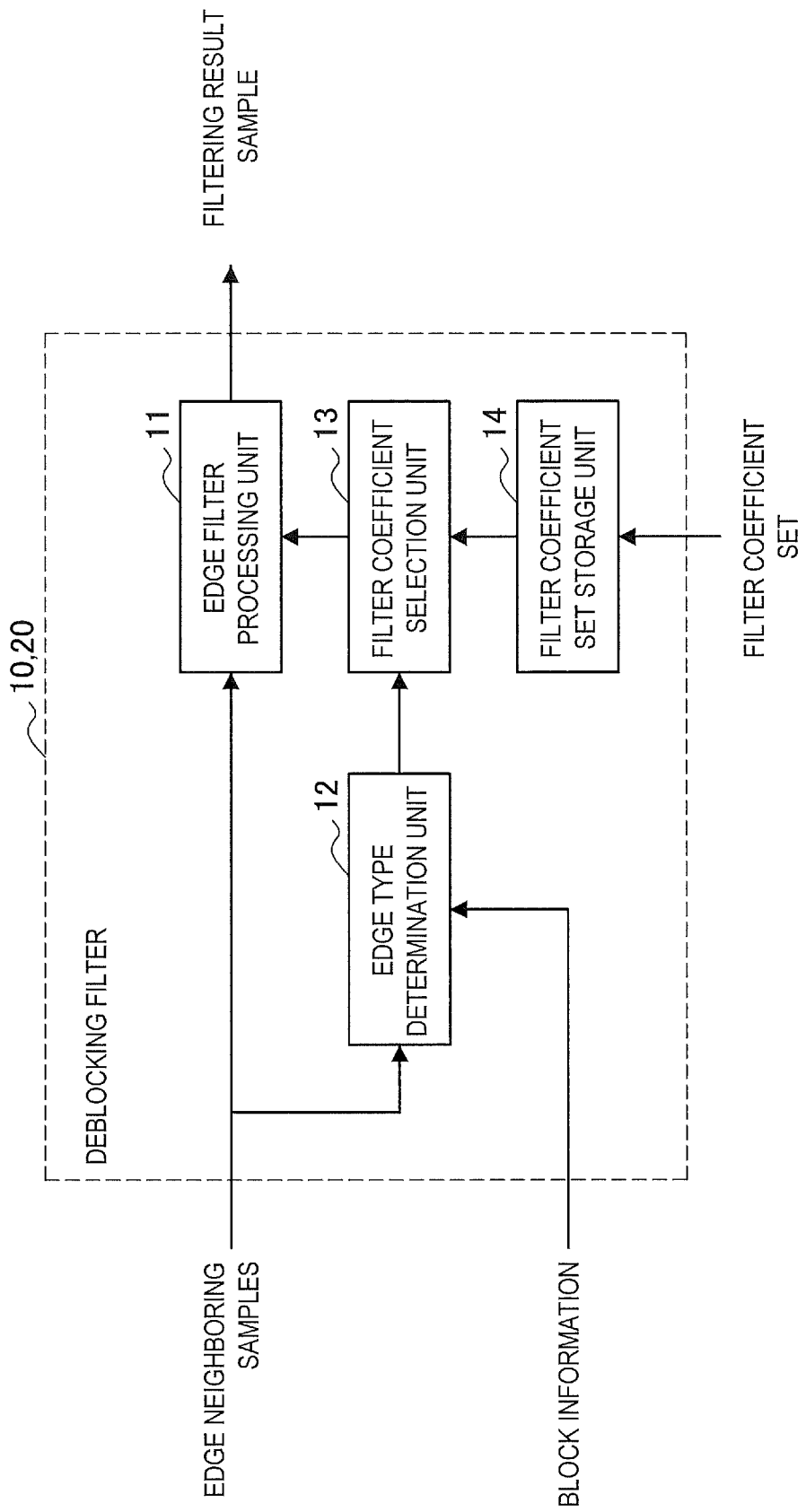
FIG. 3 is a block diagram illustrating an internal configuration of a deblocking filter used in the image coding apparatus and the image decoding apparatus according to an embodiment.

In the present embodiment, any of the deblocking filters 10 and 20 may be illustrated as in FIG. 3.

The deblocking filters 10 and 20 perform deblocking filter processing based on the provided filter coefficient set. The filter coefficient set is provided from the filter coefficient decision unit 120 to the deblocking filter 10 constituting the image coding apparatus 100 (the in-loop filter unit 108). In addition, the decoded filter coefficient set is provided from the entropy decoding unit 204 to the deblocking filter 20 constituting the image decoding apparatus 200 (the in-loop filter unit 208).

As illustrated in FIG. 3, each of the deblocking filters 10 and 20 includes an edge filter processing unit 11, an edge type determination unit 12, a filter coefficient selection unit 13 and a filter coefficient set storage unit 14. Hereinafter, an overview of each component constituting the deblocking filters 10 and 20 will be described. A detailed operation of each component constituting the deblocking filters 10 and 20 will be described in the following paragraphs describing the operation.

The filter coefficient set storage unit 14 stores provided filter coefficient sets.

For each block edge (block edge of each block) of a processing target picture, the edge type determination unit 12 determines a type of each block edge (the block edge of each block) of the processing target picture by using information (referred to hereinafter as "block information") about blocks on both sides of a block edge (both sides of vertical and horizontal block edges) and sample values of neighboring samples of each block edge of processing target blocks. For example, the block information includes a prediction mode of a processing unit corresponding to the processing target blocks, motion vector information, quantization parameters, information on presence or absence of transform coefficients (e.g., information indicating presence or absence of non-zero transform coefficients) and the like.

The filter coefficient selection unit 13 selects any filter coefficient from the filter coefficient sets stored in the filter coefficient set storage unit 14 depending on the edge type determined by the edge type determination unit 12.

The edge filter processing unit 11 performs filter processing (processing of the deblocking filter) on edge neighboring samples of edges of all processing target blocks (all vertical edges and all horizontal edges related to each block of the processing target picture) by using the filer coefficient selected by the filter coefficient selection unit 13, and outputs sample values of a filter processing result (picture data subjected to filter processing).

(A-2) Operation of Embodiment

Next, operations (an image coding method and an image decoding method of an embodiment) of the image transmission system 1 in the present embodiment having the above described configuration will be described.

Hereinafter, processing of the deblocking filters 10 and 20 will be mainly described.

As described above, in the edge filter processing unit 11 of the deblocking filters 10 and 20, filter coefficients used for filter processing are set to variable values (filter coefficients selected from the provided filter coefficient set) instead of fixed values. As described above, the edge filter processing unit 11 performs deblocking filter processing using the filter coefficients selected by the filter coefficient selection unit 13 on all processing target block edges (all of the vertical edges and all of the horizontal edges constituting the processing target picture).

The edge filter processing unit 11 obtains sample values $p_i'$ and $q_i'$ after filter processing (after deblocking filter processing) from sample values $p_i$ and $q_i$ of a reconstructed picture around the block edge (block boundary) as illustrated in FIG. 7, for example. The edge filter processing unit 11 obtains the sample values $p_i'$ and $q_i'$ after filter processing from the sample values $p_i$ and $q_i$ of the reconstructed picture around the block edge (block boundary) by using expressions (2) and (3) below, for example. In the expressions (2) and (3) below, the sample values $p_i'$ and $q_i'$ after filter processing are obtained from the sample values $p_i$ and $q_i$ of the reconstructed picture through linear combination of input sample values (sample values $p_i$ and $q_i$ before filter processing).

$$p_i' = \text{Clip1}(p_i + ((\Sigma_j a_{ij} p_j + \Sigma_j b_{ij} q_j + c_i r) >> s)) \quad (2)$$

$$q_i' = \text{Clip1}(q_i + ((\Sigma_j d_{ij} p_j + \Sigma_j e_{ij} q_j + f_i r) >> s)) \quad (3)$$

In the above expressions (2) and (3), $a_{ij}$, $b_{ij}$, $c_i$, $d_{ij}$, $e_{ij}$ and $f_i$ are filter coefficients provided to the edge filter processing unit 11 from the filter coefficient selection unit 13. In other words, $a_{ij}$, $b_{ij}$, $c_i$, $d_{ij}$, $e_{ij}$ and $f_i$ are coefficients of linear combination in the above expressions (2) and (3). In addition, in the above expressions (2) and (3), s is a shift amount s for performing a fixed point arithmetic of an integer arithmetic, and r indicates an offset "r=1<<(s-1)" for a rounding arithmetic based on the shift amount s. Further, in the above expressions (2) and (3), Clip1 is a function of clipping a sample value in an effective sample value range. For example, in the case where an 8-bit picture is a processing target, the effective sample value range is a range of 0 to 255. In the case of a 10-bit picture, for example, the effective sample value range may be a range of 0 to 1023. Further, in the above expressions (2) and (3), the subscript i indicates a sample location to be changed by the filter.

For example, when samples up to the third sample from a block edge (block boundary) are changed such as a luma strong filter of HEVC, "i=0, 1, 2" is set. Further, in the above expressions (2) and (3), the subscript j indicates a sample location to be input to a filter. For example, when samples up to the fourth sample from a block edge (block boundary) are referred to such as a luma strong filter of HEVC, "j=0, 1, 2, 3" is set.

Meanwhile, in the edge filter processing unit 11, an influence range (e.g., the number of samples from a boundary line of a block edge whose sample values are changed) and a reference range (e.g., how many samples from the boundary line of the block edge is set to be within a range referred to as a filter input) of the filter may vary for each edge type determined by the edge type determination unit 12. For example, the edge filter processing unit 11 sets the number of samples of the reference range to 3 and sets the number of samples of the influence range to 2 for a filter equivalent to a luma weak filter of HEVC. In addition, with regard to a filter equivalent to a chroma filter of HEVC, the edge filter processing unit 11 sets the number of samples of a reference range to 2 and sets the number of samples of a influence range to 1, for example.

In the deblocking filters 10 and 20, first of all, the edge type determination unit 12 determines a block edge type when neighboring samples of a block edge (block boundary) and block information of blocks on both sides of the block edge are input, for example.

For example, when any of the blocks on both sides of the block edge has been coded in the intra-mode such as HEVC, the edge type determination unit 12 may determine the block edge as a type to which a luma strong filter is applied. In addition, when different pictures are referred to in the blocks on both sides of the block edge although the blocks have been inter-coded or when the same picture is referred to but motion vectors have a difference that is not negligible in the blocks on both sides of the block edge, for example, the edge type determination unit 12 may determine the block edge as a type to which a luma weak filter is applied. Further, the edge type determination unit 12 may determine a block edge of a chrominance component picture as a type to which a chroma filter different from that for a luminance component is applied, such as HEVC, for example. As described above, the edge type determination unit 12 determines the type of the block edge (type of the filter to be applied) on the basis of block information related to the blocks on both sides of the block edge. The number of block edge types determined by the edge type determination unit 12 may be two types of luma filters (a luma strong filter and a luma weak filter) and one type of chroma filter according to determination similar to HEVC or may be classified into the larger number of types, for example.

In addition, the edge type determination unit 12 may add a type that turns off deblocking filter processing, to the determination result. For example, the type that turns off deblocking filter processing may be determined by threshold value processing with respect to magnitude relation between sample values of edge neighboring samples before filtering and the like, such as HEVC. In this case, the edge filter processing unit 11 may set sample values before filter processing (sample values without change) as sample values of a filtering result, for neighboring samples of a block edge determined as a type that turns off deblocking filter processing in the edge type determination unit 12.

The filter coefficient sets stored in the filter coefficient set storage unit 14 include a plurality of sets of filter coefficients $a_{ij}$, $b_{ij}$, $c_i$, $d_{ij}$, $e_{ij}$ and $f_i$, which are for respective edge types. Hereinafter, the set of filter coefficients $a_{ij}$, $b_{ij}$, $c_i$, $d_{ij}$, $e_{ij}$ and $f_i$ for respective edge types will be simply called "filter coefficients."

The filter coefficient selection unit 13 provides one filter coefficient (a set of $a_{ij}$, $b_{ij}$, $c_i$, $d_{ij}$, $e_{ij}$ and $f_i$) from among the filter coefficient sets to the edge filter processing unit 11 depending on the determination result of the edge type determination unit 12.

Then, the edge filter processing unit 11 obtains sample values $p_i'$ and $q_i'$ of the filtering result according to the above expressions (2) and (3) by using the filter coefficient selected by the filter coefficient selection unit 13. Further, the edge filter processing unit 11 may use the sample values before filter processing (sample values without change) as sample values of the filtering result for samples out of a designated influence range, for example.

The edge filter processing unit 11 performs deblocking filter processing by performing edge filter processing as described above on all block edges (all vertical edges and all horizontal edges). Further, the edge filter processing unit 11 may be configured to allocate different filter coefficients to a vertical edge and a horizontal edge.

As described above, the filter coefficient decision unit 120 designs an optimal filter coefficient and stores obtained filter coefficient sets in the filter coefficient set storage unit 14 of the deblocking filter 10 included in the in-loop filter unit 108 in the image coding apparatus 100. Further, in the image coding apparatus 100, a filter coefficient set decided by the filter coefficient decision unit 120 is multiplexed with coded streams (coded data) by the entropy coding unit 104 and provided to the image decoding apparatus 200.

In the entropy coding unit 104, for example, coding using slice header or higher syntax like a parameter set such as a picture parameter set may be used as a method of multiplexing a filter coefficient set. In addition, in the image decoding apparatus 200, the entropy decoding unit 204 decodes the filter coefficient set that has been multiplexed with the coded streams and that is used in the deblocking filter, stores the filter coefficient set in the filter coefficient set storage unit 14 of the deblocking filter 20 and applies the filter coefficient set to filter processing (processing of the deblocking filter). For example, the entropy coding unit 104 may perform entropy-coding on the value of each filter coefficient constituting the filter coefficient set, by using variable length coding or the like, for example.

Next, filter coefficient set design processing of the filter coefficient decision unit 120 will be described.

Hereinafter, sample values of an input picture at positions corresponding to sample values $p_i$ and $q_i$ of a reconstructed picture neighboring a block edge (block boundary) and sample values $p_i'$ and $q_i'$ after filtering are referred to as $P_i$ and $Q_i$.

In addition, in the present embodiment, the filter coefficient decision unit 120 designs filter coefficients $a_{ij}$, $b_{ij}$, $c_i$, $d_{ij}$, $e_{ij}$ and $f_i$ such that difference between the sample values $p_i'$ and $q_i'$ after filtering and the sample values $P_i$ and $Q_i$ of the input picture is minimized. As long as the filter coefficient decision unit 120 designs the filter coefficients $a_{ij}$, $b_{ij}$, $c_i$, $d_{ij}$, $e_{ij}$ and $f_i$ such that difference (distance) between the sample values $p_i'$ and $q_i'$ after filtering and the sample values $P_i$ and $Q_i$ of the input picture is minimized (or is a predetermined value or less), a specific method thereof is not limited. For example, the filter coefficient decision unit 120 may obtain filter coefficients that minimize the value represented by the expression (4) below by using the least square method.

Specifically, the filter coefficient decision unit 120 collects sample values $p_i$ and $q_i$ before filter processing of edge neighboring samples and corresponding sample values $P_i$ and $Q_i$ of the input picture for which the same filter coefficient will be used, and decides filer coefficients by using the least square method (minimization of the expression (4) below), for example. For example, the filter coefficient decision unit 120 may determine the type of each block edge in a target picture through a determination process similar to the edge type determination unit 12, acquire sample values $p_i$ and $q_i$ and sample values $P_i$ and $Q_i$ which are samples for each type and calculate filter coefficients for each type by using the acquired samples to obtain the filter coefficients as the latest filter coefficient set. In this case, the filter coefficient decision unit 120 may acquire the samples for each type by using the determination result of the edge type determination unit 12. In addition, the filter coefficient decision unit 120 may acquire a filter coefficient set for each of all target pictures serving as a coding target or may obtain a filter coefficient set at a predetermined interval, for example. Further, the filter coefficient decision unit 120 may acquire a filter coefficient set for each of slices obtained by dividing the target picture, for example. As described above, a picture that is a target for which the filter coefficient decision unit 120 acquires a filter coefficient set (timing of acquiring the filter coefficient set) is not limited.

$$\Sigma(p_i'-P_i)^2, \Sigma(q_i'-Q_i)^2 \qquad (4)$$

As described above, the filter coefficient decision unit 120 obtains an optimally designed filter coefficient set for each block edge type and performs provision to the deblocking filter 10 and the image decoding apparatus 200 by using the optimally designed filter coefficient set.

(A-3) Effects of Embodiment

According to the present embodiment, the following effects are obtained.

In the present embodiment, filter coefficients used in the deblocking filter 10 of the image coding apparatus 100 and the deblocking filter 20 of the image decoding apparatus 200 is appropriately set from filter coefficient sets that can be changed arbitrarily. Accordingly, in the image coding apparatus of the present embodiment, it is possible to perform optimal filter processing depending on properties of a coding target picture, reduce picture quality deterioration due to block distortion and generate coded streams with higher coding efficiency.

In addition, in the edge filter processing unit 11 constituting the deblocking filters 10 and 20 of the present embodiment, an influence range and a reference range of the filter may be set differently for each edge type determined by the edge type determination unit 12. Accordingly, the number of filter coefficients for each filter coefficient set used in the deblocking filters 10 and 20 of the present embodiment is set as a minimum, and coded streams with higher coding efficiency can be generated.

(B) Other Embodiments

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

(B-1) Although, in the above embodiment, the example of applying the embodiment of the present invention to the image transmission system (the image coding apparatus and the image decoding apparatus) has been described, the embodiment can be used for various other coding processes. For example, the deblocking filter of the above embodiment (method of causing appropriate filter coefficients to be set from among a plurality of filter coefficient sets) may be applied to a combination of various prediction processes and transform quantization processes related to coding. For example, the filter selection method in the deblocking filter of the above embodiment may be applied to coding processing such as a combination of various coding tools and in-loop filter processes.

(B-2) In the image coding apparatus 100 and the image decoding apparatus 200 of the above embodiment, a deblocking filter using fixed filter coefficients and the deblocking filter of the above embodiment (method of causing appropriate filter coefficients to be set from among a plurality of filter coefficient sets) may be used together. In this case, the filter coefficient decision unit 120 may set a flag (referred to hereinafter as "filter coefficient set application flag") indicating whether a fixed deblocking filter (default deblocking filter) is used for each target picture and may control the deblocking filters 10 and 20 such that the deblocking filter of the above embodiment is applied when the filter coefficient set application flag is ON, and the fixed deblocking filter is applied when the filter coefficient set application flag is OFF. For example, the filter coefficient decision unit 120 may design filter coefficient sets and provide the filter coefficient sets to the deblocking filter 10 and the entropy coding unit 104 only when the filter coefficient set application flag is ON. In this case, when the filter coefficient set application flag is OFF, filter coefficient sets are not provided from the filter coefficient decision unit 120 and filter processing is performed according to fixed filter coefficients in the deblocking filters 10 and 20. In addition, the filter coefficient decision unit 120 may set the filter coefficient set application flag for each block edge type and generate filter coefficient sets including only filter coefficients corresponding to some types. In this case, filter coefficients of a type for which the filter coefficient set application flag is set to OFF are not included in the filter coefficient sets, and thus the deblocking filters 10 and 20 apply fixed default filter coefficients to a type having filter coefficients that are not included in the filter coefficient sets.

(B-3) In processing of the edge filter processing unit 11, the shift amount s used in the above expressions (2) and (3) may be set to about 3 in which is substantially equivalent to that of HEVC or may be set to a larger fixed value that can express coefficients with higher accuracy, or the shift amount s may be variable by being signaled through a parameter set or the like. Furthermore, when the reference range is 3 and the influence range is 2, for example, although filter coefficients used in deblocking filter processing in the deblocking filters 10 and 20 are composed of 28 parameters (coefficients), the number of coefficients which can be freely set may be reduced by imposing restrictions of $a_{ij}=e_{ij}$ and $b_{ij}=d_{ij}$ in consideration of symmetry or the like, and thereby the number of coefficients to be coded is reduced. In this case, it may be possible to impose restrictions of setting constant terms $c_i$ and $f_i$ to always be 0 (no constant term) depending on edge type.

(B-4) The filter coefficient decision unit 120 may be configured to perform rate-distortion optimization processing of evaluating trade-off between a degree of sample quality improvement according to deblocking processing and a code amount necessary for coding coefficient sets for deblocking processing, and determining use/non-use of deblocking processing of the embodiment of the present invention.

What is claimed is:

1. An image coding apparatus that codes pictures constituting an image, the image coding apparatus comprising:
    a coding processing unit configured to perform coding processing on a target picture of coding in units of blocks and output coded data, the coding processing unit performing filter processing on a picture generated during coding processing by using a filter unit configured to perform filter processing using at least a deblocking filter that includes
        a filter coefficient set storage unit configured to store the filter coefficient set composed of a plurality of filter coefficients,
        an edge type determination unit configured to determine a type of a block edge, for each block edge of the target picture,
        a filter coefficient selection unit configured to select the filter coefficients to be applied from the filter coefficient set stored in the filter coefficient set storage unit depending on the type determined by the edge type determination unit, for each block edge of the target picture, and
        a filter processing unit configured to perform filter processing on neighboring samples of the block edge by using the filter coefficients selected by the filter coefficient selection unit, wherein
        for each block edge of the target picture, the filter processing unit obtains sample values after filter processing for the neighboring samples of the block edge, using a linear combination of all of the sample values before filter processing of the neighboring samples of the block edge, the filter coefficients being coefficients of the linear combination, and
        among all linear combinations used to obtain all block edges of the target picture, at least one linear combination has all of the coefficients thereof to be non-zero coefficients,
    wherein the coding processing unit includes
        a prediction unit configured to predict the target picture of coding to generate a predictive picture,
        a coding unit configured to code a residual signal between the target picture and the predictive picture, and
        an adding unit configured to adds the residual signal to the predictive picture to generate a first reconstructed picture; and
    a filter coefficient decision unit configured to decide the filter coefficient set with reference to the first reconstructed picture and the target picture of coding by minimizing a difference between the first reconstructed picture and the target picture of coding, so as to assign different values to the filter coefficient set for different reconstructed pictures and different target pictures.

2. The image coding apparatus according to claim 1, wherein the filter unit performs filter processing using at least the deblocking filter on the first reconstructed picture, generate a first decoded picture, and output the first decoded picture as a reference picture to be used by the prediction unit.

3. The image coding apparatus according to claim 2, wherein the edge type determination unit determines the type of the block edge by using block information about blocks on both sides of the block edge and sample values of the neighboring samples of the block edge, for each block edge of the target picture.

4. The image coding apparatus according to claim 3, wherein the filter processing unit changes a range of samples to be referred to in filter processing and a range of samples to be changed in filter processing for each block edge type of the target picture.

5. The image coding apparatus according to claim 1, wherein the coding unit outputs coded streams coded by multiplexing the filter coefficient set decided by the filter coefficient decision unit.

6. The image coding apparatus according to claim 1, wherein the filter coefficient decision unit minimizes the difference between the first reconstructed picture and the target picture of coding using a least square method.

7. The image coding apparatus according to claim 1, wherein the filter coefficient decision unit performs rate-distortion optimization processing of evaluating trade-off between a degree of improvement in picture quality according to deblocking filter processing and a code amount necessary for coding a filter coefficient set, and determining use/non-use of the filter coefficient set.

8. An image decoding apparatus that decodes coded data in which respective pictures constituting an image have been coded, the image decoding apparatus comprising:

a decoding processing unit configured to decode a target picture of decoding from coded data in units of blocks, the decoding processing unit performing filter processing on a picture generated during decoding processing by using a filter unit configured to perform filter processing using at least a deblocking filter, wherein the deblocking filter includes
- a filter coefficient set storage unit configured to store a filter coefficient set composed of a plurality of filter coefficients,
- an edge type determination unit configured to determine a type of a block edge, for each block edge of the target picture,
- a filter coefficient selection unit configured to select the filter coefficients to be applied from the filter coefficient set stored in the filter coefficient set storage unit depending on the type determined by the edge type determination unit, for each block edge of the target picture, and
- a filter processing unit configured to perform filter processing on neighboring samples of the block edge by using the filter coefficients selected by the filter coefficient selection unit, wherein
- for each block edge of the target picture, the filter processing unit obtains sample values after filter processing for the neighboring samples of the block edge, using a linear combination of all of the sample values before filter processing of the neighboring samples of the block edge, the filter coefficients being coefficients of the linear combination,
- among all linear combinations used to obtain all block edges of the target picture, at least one linear combination has all of the coefficients thereof to be non-zero coefficients, and
- the decoding processing unit acquires the filter coefficient set from a filter coefficient decision unit of an image coding apparatus, the filter coefficient set being decided with reference to a first reconstructed picture and the target picture of coding by minimizing a difference between the first reconstructed picture and the target picture of coding, to thereby have different values assigned by the filter coefficient decision unit for different reconstructed pictures and different target pictures.

9. The image decoding apparatus according to claim 8, wherein the decoding processing unit includes:
- a prediction unit configured to predict a target picture of decoding to generate a predictive picture;
- a decoding unit configured to decode coded data to acquire a residual signal between the target picture and the predictive picture; and
- an adding unit configured to add the residual signal to the predictive picture to generate a second reconstructed picture,
- wherein the filter unit performs filter processing using at least the deblocking filter on the second reconstructed picture, generates a second decoded picture, outputs the second decoded picture as a decoding result of the image decoding apparatus, and provides the second decoded picture to the prediction unit as a reference picture.

10. The image decoding apparatus according to claim 8, wherein the decoding processing unit acquires the filter coefficient set from the coded data, the filter coefficient set is stored in the filter coefficient set storage unit.

11. An image coding method that is performed by an image coding apparatus configured to code respective pictures constituting an image, wherein the image coding apparatus includes a coding processing unit and a filter coefficient decision unit, the coding processing unit includes a prediction unit, a coding unit and an adding unit, the image coding method comprising:
- the coding processing unit performing coding processing on a target picture of coding in units of blocks and outputting coded data, the coding processing unit performing filter processing on a picture generated during coding processing using a filter unit configured to perform filter processing using at least a deblocking filter;
- the filter coefficient decision unit deciding a filter coefficient set with reference to a first reconstructed picture and the target picture of coding by minimizing a difference between the first reconstructed picture and the target picture of coding, so as to assign different values to the filter coefficient set for different reconstructed pictures and different target pictures;
- the prediction unit predicting the target picture of coding to generate a predictive picture;
- the coding unit coding a residual signal between the target picture and the predictive picture; and
- the adding unit adding the residual signal to the predictive picture to generate the first reconstructed picture, wherein
- the deblocking filter includes a filter coefficient set storage unit, an edge type determination unit, a filter coefficient selection unit, and a filter processing unit,
- the filter coefficient set storage unit stores the filter coefficient set composed of a plurality of filter coefficients,
- the edge type determination unit determines a type of a block edge, for each block edge of the target picture,
- the filter coefficient selection unit selects the filter coefficient set to be applied depending on the type determined by the edge type determination unit, for each block edge of the target picture,
- the filter processing unit obtains sample values after filter processing for neighboring samples of the block edge, using a linear combination of all of the sample values before filter processing of the neighboring samples of the block edge, the filter coefficients being coefficients of the linear combination,
- among all linear combinations used to obtain all block edges of the target picture, at least one linear combination has all of the coefficients thereof to be non-zero coefficients, and
- the filter processing unit performs filter processing on the neighboring samples of the block edge by using the filter coefficients selected by the filter coefficient selection unit, for each block edge of the target picture.

12. An image decoding method that is performed by an image decoding apparatus configured to decode coded data in which respective pictures constituting an image have been coded, wherein the image decoding apparatus includes a decoding processing unit, the image decoding method comprising:
- the decoding processing unit decoding a target picture of decoding from coded data in units of blocks, the decoding processing unit performing filter processing on a picture generated during decoding processing by using a filter unit configured to perform filter processing using at least a deblocking filter, the decoding processing unit acquiring a filter coefficient set from a filter coefficient decision unit of an image coding apparatus, the filter coefficient decision unit deciding the filter coefficient set with reference to a first reconstructed picture and the target picture of coding by minimizing a difference between the first reconstructed picture and the target picture of cording, so as to assign different values to the filter coefficient set for different reconstructed pictures and different target pictures, wherein the deblocking filter includes a filter coefficient set storage unit, an edge type determination unit, a filter coefficient selection unit, and a filter processing unit, the filter coefficient set storage unit stores the filter coefficient set composed of a plurality of filter coefficients, the edge type determination unit determines a type of a block edge, for each block edge of the target picture, the filter coefficient selection unit selects a filter to be applied depending on the type determined by the edge type determination unit, for each block edge of the target picture, the filter processing unit obtains sample values after filter processing for neighboring samples of the block edge, using a linear combination of all of the sample values before filter processing of the neighboring samples of the block edge, the filter coefficients being coefficients of the linear combination, among all linear combinations used to obtain all block edges of the target picture, at least one linear combination has all of the filter coefficients thereof to be non-zero coefficients, and the filter processing unit performs filter processing on the neighboring samples of the block edge by using the filter coefficients selected by the filter coefficient selection unit, for each block edge of the target picture.

13. An image transmission system comprising:

an image coding apparatus configured to code respective pictures constituting an image; and an image decoding apparatus configured to decode coded data coded by the image coding apparatus, wherein the image coding apparatus described in claim 1 is applied as the image coding apparatus, and the image decoding apparatus includes a decoding processing unit configured to decode decoding target picture of decoding from coded data in units of blocks and perform filter processing on a picture generated during decoding processing by using a filter unit configured to perform filter processing using at least a deblocking filter, the deblocking filter includes:

a filter coefficient set storage unit configured to store a filter coefficient set composed of a plurality of filter coefficients;

an edge type determination unit configured to determine a type of a block edge, for each block edge of the target picture;

a filter coefficient selection unit configured to select filter coefficients to be applied from the filter coefficient set stored in the filter coefficient set storage unit depending on the type determined by the edge type determination unit, for each block edge of the target picture; and a filter processing unit that performs filter processing on neighboring samples of the block edge by using the filter coefficients selected by the filter coefficient selection unit, for each block edge of the target picture.

* * * * *